United States Patent

Weimer

[15] 3,660,667

[45] May 2, 1972

[54] IMAGE SENSOR ARRAY IN WHICH EACH ELEMENT EMPLOYS TWO PHOTOTRANSISTORS ONE OF WHICH STORES CHARGE

[72] Inventor: Paul Kessler Weimer, Princeton, N.J.

[73] Assignee: RCA Corporation

[22] Filed: June 22, 1970

[21] Appl. No.: 48,032

[52] U.S. Cl. ......................250/209, 250/211 J, 250/220 M, 317/235 N

[51] Int. Cl. ..................H01j 35/12, H01l 11/00, H01l 15/00

[58] Field of Search ..........................250/220 M, 211 J, 209; 317/235 N

[56] References Cited

UNITED STATES PATENTS 3,535,526 10/1970 Henry et al. ......................250/220 M 3,465,293 9/1969 Weckler ..........................250/220 M

*Primary Examiner*—James W. Lawrence
*Assistant Examiner*—T. N. Grigsby
*Attorney*—Glenn H. Bruestle

[57] ABSTRACT

An image sensor array of photodetector elements, with two phototransistors at each element. Each phototransistor has emitter, base, and collector regions, with PN junctions between the regions serving as photodetectors which integrate incident light flux. The inherent capacitance of the emitter-base junction of one phototransistor is substantially greater than the inherent capacitance of the other junctions, to provide capacitance for charge storage during the period between incident light and sampling. The emitter-base junction of the second phototransistor serves as a switch when the element is sampled, to provide an electrical output representative of the integrated light. The video output may be derived from the collector regions or from either of the emitter regions.

9 Claims, 9 Drawing Figures

INVENTOR.
PAUL K. WEIMER
BY
Herbert K. Allen
Attorney

INVENTOR.
PAUL K. WEIMER
BY Herbert L. Allen
Attorney

INVENTOR.
PAUL K. WIEMER
BY
Herbert K. Allen
Attorney

IMAGE SENSOR ARRAY IN WHICH EACH ELEMENT EMPLOYS TWO PHOTOTRANSISTORS ONE OF WHICH STORES CHARGE

BACKGROUND OF THE INVENTION

The present invention relates to solid state circuits, and more particularly, relates to that type of circuit which employs an array of image sensor elements to provide an electric signal voltage representative to an optical image input.

One manner of operating image sensor arrays is the so called "charge storage" mode, a mode of operation similar to that employed in an electron beam scanned vidicon. Charge storage operation is based on the principle that a reverse-biased PN junction will lose charge stored on the junction at a rate which is a function of the intensity of light falling on the junction. Since the total photon-generated charge passing through the reverse-biased junction is directly proportional to the integrated sum of the illumination taken over a scanning interval, then it is possible, by measuring the current which flows through each scanning pulse to recharge the inherent junction capacitance to a predetermined level, to obtain a signal which is proportional to the integrated illumination. One major advantage of this mode of operation is that it permits the use of relatively insensitive photodetectors to obtain a high operating sensitivity.

Prior solid state image sensor arrays adapted to operate in the charge storage mode have been operated successfully, but have suffered from certain disadvantages Those which have been fabricated as thin film arrays have suffered from instability and low sensitivity. Those which have been fabricated as monolithic integrated arrays have been relatively complex, and are difficult to make with enough elements in a sufficiently small area so as to provide resolution suitable for some applications, for instance television.

One type of solid state array which is operated in the charge storage mode employs a voltage-independent capacitor serially coupled to a photodiode at each element in the array. The capacitor provides the charge storage function, allowing the photodiode to function as both a photodetector and as a switch. Such a photodiode-capacitor array is described in Weimer et al, in IEEE Spectrum, Vol. 6, No. 3, March, 1969, at page 61.

Yet another approach to charge storage image sensors employs a phototransistor at each element in the array. One example of a phototransistor array operating in the charge storage mode is described by Anders et al., in the IEEE Transactions on Electron Devices, Vol. ED-15, No. 4, April, 1968, at page 191. A second phototransistor arrangement employs an MOS transistor in series with the phototransistor emitter, to perform the switching function; this array is described by Weckler et al., in the IEEE Transactions on Electron Devices, supra, at page 196.

SUMMARY OF THE INVENTION

The image sensor array of the present invention employs two phototransistors at each element of the array. Each phototransistor has emitter, base, and collector regions, with a PN junction between the emitter and base regions and a PN junction between the base and collector regions. The junctions serve as photodetectors which integrate incident light flux. The emitter-base junction of a first one of the phototransistors has an inherent capacitance which is substantially greater than that of the other junctions. Each element further includes means for applying a voltage to reverse bias the emitter-base junction of the first phototransistor, and means for directly coupling the base regions of the two phototransistors together.

In one embodiment, first and second circuit means are coupled to the two emitter regions, respectively, and output circuit means are coupled to either of the emitter regions or the collector regions. In a preferred structural arrangement, the two emitter regions are disposed in a common base region.

THE DRAWING

DETAILED DESCRIPTION

Figure 1:
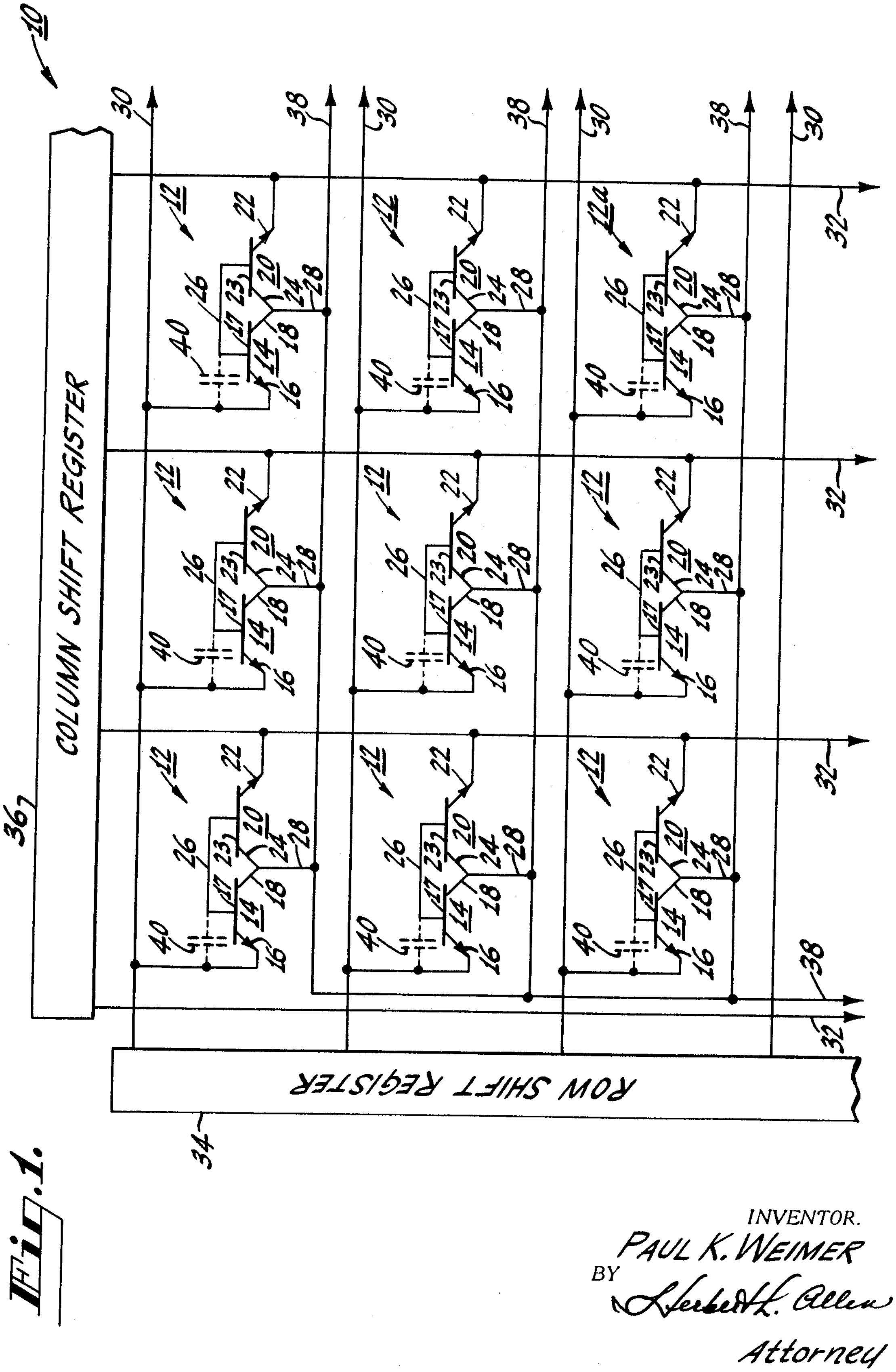
FIG. 1 is a schematic representation of the image sensor array.

A preferred embodiment of the array of the present invention is shown in FIG. 1. The array includes a plurality of image sensor elements arranged in a X-Y grid of rows and columns. Each element comprises two phototransistors with the base and collector region of one of the phototransistors coupled to the base and collector regions, respectively, of the other phototransistor.

The array, designated generally as 10 in FIG. 1, includes a plurality if image sensor elements 12 arranged in an X-Y grid of rows and columns. Each element 12 comprises two phototransistors. A first one of the phototransistors 14 has emitter, base, and collector regions 16-18, and the second phototransistor 20 also has emitter, base, and collector regions 22–24, respectively. The phototransistors 14,20 may be NPN or PNP devices; however, NPN devices are illustrated in the array 10 of FIG. 1. Further, while the phototransistors 14,20 are shown schematically in FIG. 1, it will be understood that each phototransistor 14,20 includes a PN junction between the emitter region 16,22 and the base region 17,23; and a PN junction between the base region 17,23 and the collector region 18,24, respectively. These PN junctions are hereinafter shown and described with reference to FIGS. 7 to 9.

The emitter-base PN junction of the first phototransistor 14 had an inherent capacitance which is substantially greater than the inherent capacitance of the other PN junctions. This inherent capacitance, numbered 40, is shown schematically in FIG. 1.

Each sensor element 12 further includes means 26 for directly coupling base region 17 of the first phototransistor 14 to the base region 23 of the second phototransistor 20; preferably, additional means 28 for directly coupling the collector region 18 of the first phototransistor 14 to the collector region 24 of the second phototransistor 20 is also provided.

The array 10 further comprises a plurality of row conductors 30 and a plurality of column conductors 32, with each one of the row conductors being positioned transverse to each column conductor at an insulated intersection therebetween. The array 10 also includes means for sequentially applying a scan pulse to the row conductors 30 and a scan pulse to the column conductors 32; for example, row and column shift registers 34 and 36, respectively.

As shown in FIG. 1, each one of the row conductors 30 is coupled to the emitter region 16 of each of the first phototransistors 14 in the corresponding row. Each one of the column conductors 32 is coupled to the emitter region 22 of each of the second phototransistors 20 in the corresponding column. The collector region 18,24 of the two phototransistors 14,20 are coupled to a common conductor 38 through the direct coupling means 28.

The operation of the array 10 will be described with reference to FIGS. 1 to 6. As is known, the emitter-base PN junction of each of the phototransistors 14,20 has an inherent capacitance and back resistance across the respective junctions. Further, a composite inherent capacitance and back resistance exists across the common base-common collector PN junction of the phototransistors 14,20 at each element 12. When those junctions are not illuminated, the base resistances will be very high and, consequently, the charge on the inherent junction capacitances is preserved. However, if all the junctions are illuminated, the resistances are lowered because of the generation of photocarriers in response to the light flux falling on the junctions; those lowered resistances allow the charge to leak off. Because the inherent capacitance 40 of the emitter-base junction of the first phototransistor 14 is substantially greater than the inherent capacitance of the other PN junctions, most of this charge will be stored on that capacitance during the period between scans.

Figure 2:
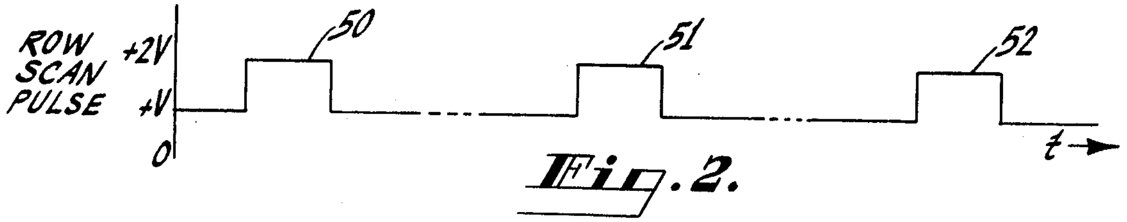
FIGS. 2 to 6 are voltage and current waveforms illustrating the operation of the array of FIG. 1.
Figure 3:
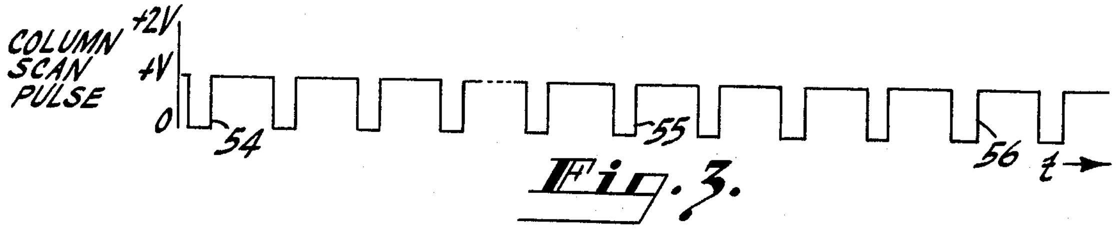
Figure 4:
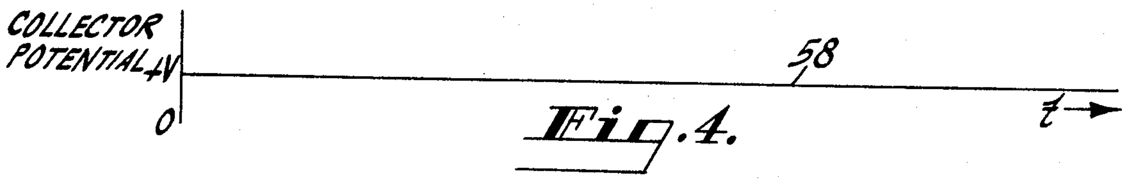

The amount of light flux falling on each element 12 may then be determined by electronically scanning the array 10 in the following manner. Noting FIG. 2, a sequence of positive row scan pulses, such as pulses 50–52 are impressed on each row conductor 30 by the row shift register 34. Row scan pulses 50–52 are assumed to be impressed sequentially on the row conductor 30 associated with one of the elements 12; for example, element 12a in the lower right-hand corner of FIG. 1. Each pulse is relatively long in duration, at least as long as the time required for the column shift register 36 to complete one cycle of its operation. Noting FIG. 3, a sequence of column scan pulses, including pulses 54–56, are impressed on each column conductor 32 by the column shift register 36. Column scan pulses 54–56 are assumed to be impressed on the column conductor 32 associated with element 12*a*. As shown in FIG. 3, each column scan pulse is formed by "stepping" the DC bias of the column shift register 36 negative to ground (zero level in FIGS. 2 and 3) for a time duration shorter than each row scan pulse. The period of time between each column pulse is equal to, or longer than the duration of each row scan pulse, so that only one column pulse occurs during each row scan pulse. By way of example, for a 512 × 512 element array operating within the U.S. television broadcast standards, the row scan pulse may be 53.5 microseconds in duration, the column pulse may be 0.1 microseconds in duration, and the time between the successive column pulses may be 63.5 microseconds. During the entire operating cycle of both row and column scan pulses, the common collector electrode 38 is positive with respect to ground, as is shown by positive voltage level 58 in FIG. 4.

While a 3 × 3 array is shown in FIG. 1, it will be understood that a much larger array may be employed within the scope of the present invention; further, the number of row and column scan pulses actually employed is, in turn, dependent on the number of sensor elements actually employed in each row and column. The voltage levels shown at the ordinate of FIGS. 2 and 3 are by way of example only, since the array will function in the intended manner with voltage levels other than that illustrated.

During the operating cycle of the array 10, the emitter-base junction of phototransistor 14 is reverse biased at all times, and the potential of the common base region 26 of the two phototransistors 14,20 is determined by the bias and amplitude of the row and column scan pulses and by the presence or absence of incident light on element 12*a*. The row and column scan pulses have such a polarity that the pulses add, and each tends to reverse-bias the emitter-base junction of phototransistor 14. Therefore, while absence of the row and column scan pulses causes the common base region 26 to remain negative relative to the emitter region 22, coincidence of the row and column scan pulses drives the common base region to the point of forward conduction.

Figure 5:
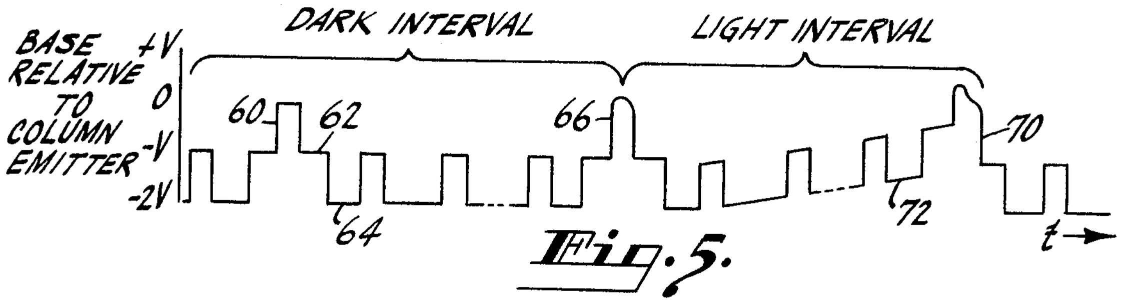
Figure 6:
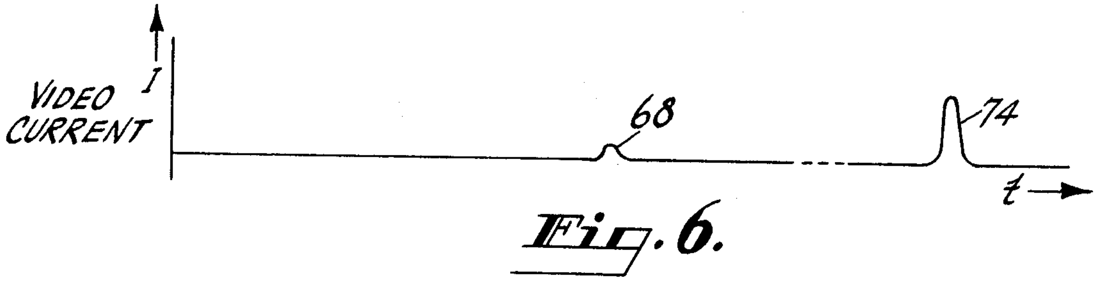

FIG. 5 is a plot of the potential of the common base region 26 of the phototransistor 14,20 in element 12*a* relative to the emitter 22 of phototransistor 20. As illustrated, during the interval between the coincidence of row and column scan pulses, this potential is substantially negative. During simultaneous application of the row and column scan pulses 50 and 54 on the associated row and column conductors 30 and 32, this potential is driven positive to zero, as indicated by the portion 60 of the curve in FIG. 5.

At the termination of the pulse 54 on the column conductor 32, the potential of the base relative to the emitter is driven to some value less than zero, as indicated by the portion 62 of the curve in FIG. 5. Then at the end of the pulse 50 on the row conductor 30, this potential is driven further negative to a value indicated by the portion 64 of the curve in FIG. 5; thereafter, each repeated pulse on the column conductor 32 has no effect on the conductance of phototransistor 20 of element 12*a*, since those pulses are not of sufficient magnitude along to bring the common base 26 to emitter 22 circuit into forward conduction.

After a complete scanning cycle, the row and column scan pulses again coincide at element 12*a*, as indicated by pulse 65 of FIG. 5. Relatively little charge has been lost by the inherent capacitance 40 (if element 12*a* has not been illuminated); consequently, only a small current will flow from the emitter 22 to the collector 28, as shown by the pulse 68 of the curve in FIG. 6, which represents the amplified current through the circuit between the emitter 22 and the common collector 28. This pulse 68 is caused by charge leakage from the inherent capacitance 40 of the emitter-base junction of the phototransistor 14 during the dark condition. Using proper fabrication techniques, this pulse is very small.

After another scanning interval, the row and column scan pulses again coincide, as shown by scanning pulses 52 and 56 of FIGS. 2 and 3, and portion 70 of the curve of FIG. 5. Assuming that there has been a condition of illumination on element 12*a* in the interval between the portions 66 and 70 of the curve in FIG. 5, the back resistances of the PN junctions will be much lower than in the dark condition previously described, and charge will leak off on the PN junction. This leakage is represented by the upward slope 72 of the curve in FIG. 5. Consequently, the inherent capacitance 40 of the emitter-base junction of phototransistor 14 will be charged at some voltage less than the maximum, and current will be required to recharge the capacitance 40 to its maximum value. The amount of current again will be proportional to the total amount of light flux which has fallen on element 12*a* in the period between scans; this current is then amplified in the circuit between the emitter 22 and the common collector 28 by the gain of the phototransistor 20, as shown at current pulse 74 in FIG. 6. This video pulse 74 may be derived from the row or column conductors 30,32 or the common collector electrode 38; however, derivation from the common electrode 38 is preferred.

The image sensor array 10 has been described in operation for television-type image translation. A suitable scanning system for this type of operation is known and described, for example, by Weimer et al. "A Self Scanned Solid State Image Sensor" 55 Proc. IEEE 1591, at page 1593, September, 1967.

Figure 7:
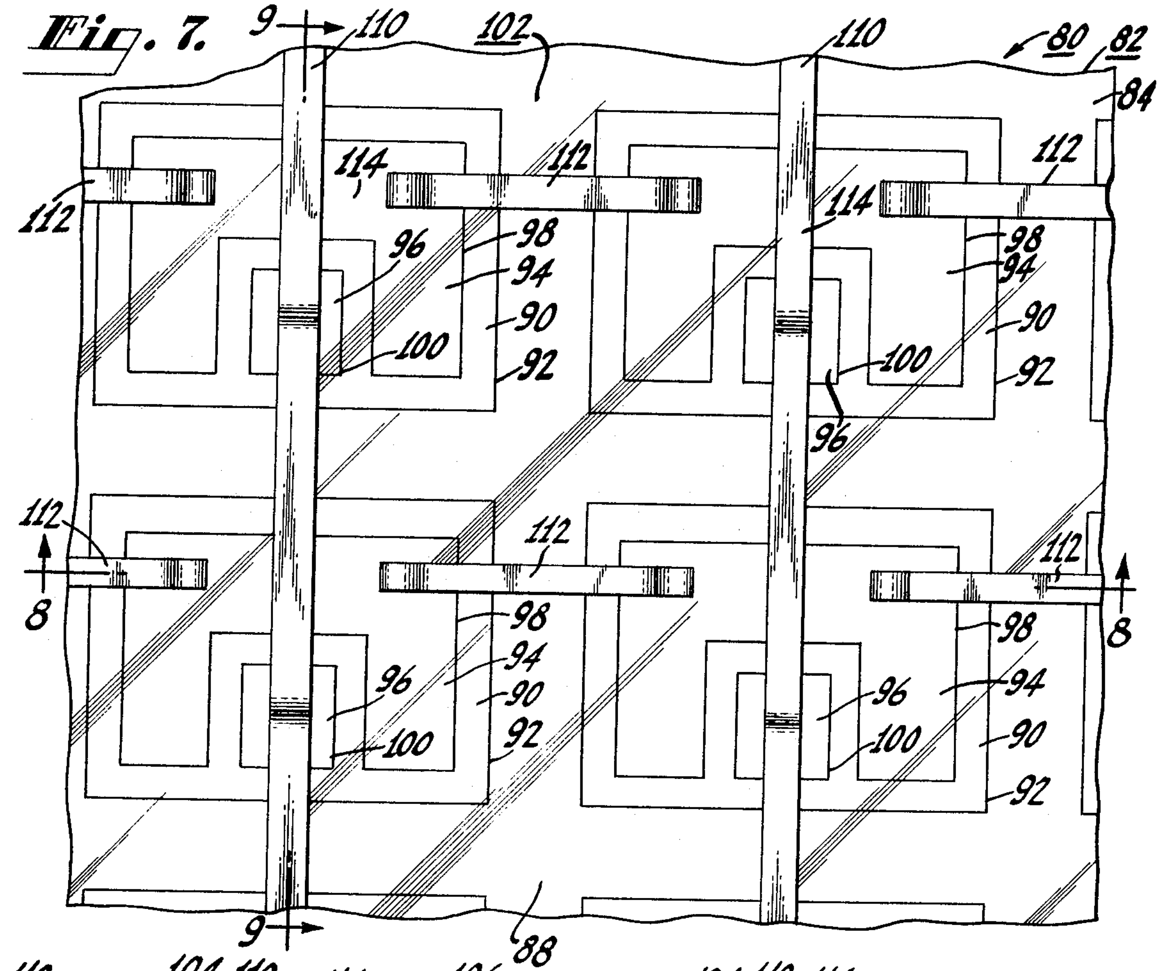
FIG. 7 is a top plan view of an integrated semiconductor body exemplifying one structure of the array of FIG. 1.
Figure 8:
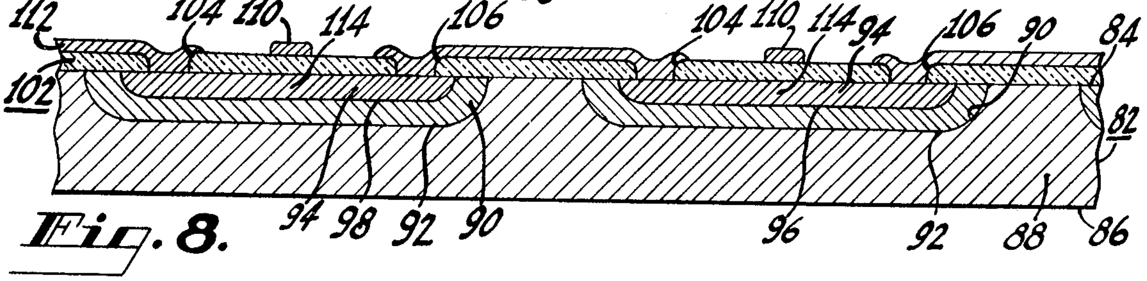
FIG. 8 is a cross-sectional view of the structure of FIG. 7, taken along the line 8—8'.
Figure 9:
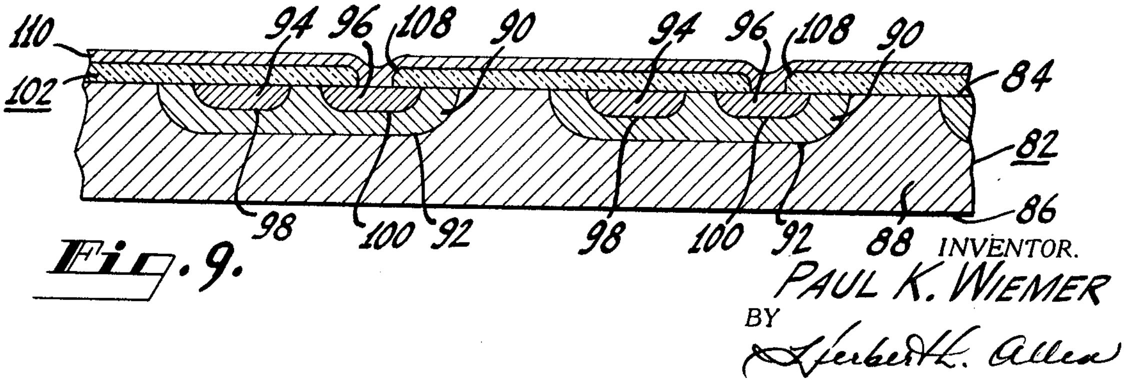
FIG. 9 is a second cross-sectional view of the structure of FIG. 7, taken along the line 9—9'.

One manner in which the sensor array of FIG. 1 may be fabricated as a monolithic integrated structure is shown in FIGS. 7–9. The integrated array, referred to generally as 80, is formed in a semiconductor body 82 having upper and lower opposed major surfaces 84 and 86, respectively. Preferably, the body 82 is of N type conductivity and serves as a collector region 88 between the two surfaces.

A plurality of P type base regions 90 are disposed in the collector region 88 in an array of rows and columns. Each of the base regions 90 forms a base-collector PN junction 92 which extends to the upper surface 84. Two N type emitter regions 94 and 96 are disposed in each base region 90. A first one of the emitter regions 94 forms an emitter-base PN junction 98 which extends to the upper surface 84. In a like manner, the second emitter region 96 forms a second emitter-base PN junction 100 which also extends to the upper surface 84. The first emitter region 94 is substantially larger than the second emitter region 96, to insure that the inherent capacitance of the PN junction 98 between that region and the base region 90 is greater than the inherent capacitance of the other emitter-base PN junction 100. The inherent capacitance of the large emitter-base junction 98 is greater than that of the base-collector junction 92, because the emitter-base junction 98 is always more abrupt. Preferably, the first emitter region 94 surrounds a major portion of the second emitter region 96.

An insulating coating 102 overlies the upper surface 84. The coating 102 has a plurality of apertures with each aperture exposing a portion of one of the emitter regions 94,96 at the upper surface 84. Preferably, three of the apertures are located at each two-emitter site; for example, two of the apertures 104 and 106 expose the first emitter 94 and the third aperture 108 exposes the second emitter 96.

A plurality of column conductors 110 are disposed on the coating 102 and through the aperture 108 to interconnect all of the second emitters 96 in the corresponding column. A plurality of row conductors 112 are disposed over the coating 102 and into the apertures 104 and 106 to interconnect all of the first emitters 94 in the corresponding row. A portion 114 of each first emitter region 94 underneath the column conductors serves as a part of the row conductor 30 of FIG. 1 between apertures 104 and 106. This monolithic array 80 may be made by well known integrated circuit fabrication techniques, which are therefore not described herein.

The simplicity of the structure shown in FIGS. 7–9 is evident, in that only two diffusions and a single metallization are required to form the complete sensor array. This sensor array allows the use of a large number of high resolution sensor elements with close spacing between elements, thus providing efficient area utilization. Further, the video signal of the array can be derived from the common collector conductor or from video coupling circuits which are coupled to either the row or column conductors.

I claim:

1. In an image sensor array, a solid state image sensor element comprising:

two phototransistors, each phototransistor having emitter, base, and collector regions;

a PN junction between the emitter and base regions and a PN junction between the base and collector regions of each said phototransistor, said junctions serving as photodetectors which integrate incident light flux;

means for storing charge on the emitter-base PN junction of a first one of said phototransistors;

means for continuously reverse-biasing said emitter-base PN junction of said first phototransistor; and means directly coupling the base regions of said phototransistors together.

2. An image sensor element according to claim 1, further comprising means directly coupling the collector regions of said phototransistors.

3. A solid state image sensor array, comprising:

a plurality of row and column conductors, each one of said row conductors being positioned transverse to each one of said column conductors at an insulated intersection therebetween;

a plurality if image sensor elements according to claim 1, each one of said elements located at one of said intersections;

the emitter region of said first phototransistor coupled to either said row or column conductor at each intersection; and the emitter region of the second phototransistor coupled to the other of said row or column conductor at each intersection.

4. An image sensor array according to claim 3, further comprising means for sequentially applying a scan pulse to said row conductors and a scan pulse to said column conductors.

5. An image sensor array according to claim 4, further comprising the collector regions of all of said phototransistors coupled to a common conductor.

6. A photodetector circuit, comprising:

two phototransistors, each phototransistor having emitter, base, and collector regions;

a PN junction between each emitter and base region;

means directly coupling the base regions of said phototransistors;

means directly coupling the collector regions of said phototransistors;

first circuit means coupled to the emitter region of a first one of said phototransistors for applying a scanning pulse thereto;

second circuit means coupled to the emitter region of the second phototransistor for applying a scanning pulse thereto;

means coupled to said collector region coupling means for deriving an output signal from said circuit; and means for storing charge on the PN junction between the emitter and base regions of said first phototransistor.

7. A photodetector circuit, comprising:

two phototransistors, each phototransistor having emitter, base, and collector regions;

a PN junction between each emitter and base region;

means directly coupling the base region of said phototransistors;

means directly coupling the collector regions of said phototransistors;

first circuit means coupled to the emitter region of a first one of said phototransistors for applying a scanning pulse thereto;

second circuit means coupled to the emitter region of the second phototransistor for applying a scanning pulse thereto;

means coupled to one of said emitter regions for deriving an output signal from said circuit; and means for storing charge on the PN junction between the emitter and base regions of said first phototransistor.

8. A solid state image sensor element, comprising:

a semiconductor body having two opposed major surfaces;

a first conductivity-type collector region in said body;

a second conductivity-type base region in said collector region and forming a base-collector PN junction which extends to a first one of said two surfaces;

two first conductivity-type emitter regions in said base region, each emitter region forming an emitter-base PN junction which extends to said first surface; and a first one of said emitter regions being substantially larger than the other emitter region, so that the inherent capacitance of the PN junction between the first emitter region and the base region is substantially greater than the inherent capacitance of both of the other two PN junctions.

9. An image sensor element according to claim 8, wherein said collector region extends to the second one of said two surfaces.

* * * * *